United States Patent

[11] 3,626,238

[72] Inventor Gerhard Forster
Wuenlos, Switzerland
[21] Appl. No. 852,766
[22] Filed Aug. 25, 1969
[45] Patented Dec. 7, 1971
[73] Assignee RCA Corporation
[32] Priority Aug. 27, 1968
[33] Great Britain
[31] 40,978/68

[54] THYRISTOR CONTROLLED POWER SUPPLY CIRCUITS AND DEFLECTION CIRCUITRY ASSOCIATED WITH A KINESCOPE
8 Claims, 2 Drawing Figs.

[52] U.S. Cl. .......... 315/1
315/27 TD, 321/47, 328/262
[51] Int. Cl. .......... H01j 29/76,
H02m 7/52, H01j 23/34
[50] Field of Search .......... 315/1, 27;
328/262; 321/47

[56] References Cited

UNITED STATES PATENTS

| | | | |
|---|---|---|---|
| 2,829,304 | 4/1958 | Massman .......... | 315/27 |
| 2,896,114 | 7/1959 | Maloff .......... | 315/29 X |
| 2,997,622 | 8/1961 | Claypool .......... | 315/27 |
| 3,213,351 | 10/1965 | Walker .......... | 321/47 X |

*Primary Examiner*—Roy Lake
*Assistant Examiner*—V. Lafranchi
*Attorney*—Eugene M. Whitacre

ABSTRACT: A thyristor power supply is directly coupled to the AC power line thus eliminating the power transformer. Regulation of the supply is dependent upon both the AC potential and the DC output voltage. Other combinations of control voltage for the thyristor are described which, in turn, affect the internal impedance of the power supply of control regulation thereof.

PATENTED DEC 7 1971

3,626,238

SHEET 1 OF 2

INVENTOR.

GERHARD FÖRSTER

BY Arthur J. Levy

ATTORNEY

INVENTOR.
GERHARD FÖRSTER
BY Arthur J. Penny
ATTORNEY

THYRISTOR CONTROLLED POWER SUPPLY CIRCUITS AND DEFLECTION CIRCUITRY ASSOCIATED WITH A KINESCOPE

This invention relates to power supplies for television receivers and more particularly to power supplies utilizing thyristors.

In a television receiver for the consumer market it is desirable to provide an economical unit with optimum operating reliability. With the advent of semiconductor devices many significant contributions both in device and circuit technology, have resulted in the wide spread application of such devices in the television receiver environment. In the transition from vacuum tube receivers to those receivers employing semiconductor devices, as transistors, the designer encountered specific problems due to the dissimilarity between such devices.

For example, in the field of power supply design, vacuum tubes require substantially higher operating voltages than most readily available transistors. Due to the power supply requirements of vacuum tubes it was relatively simple to design a television receiver for direct AC line operation. Such a receiver employing vacuum tubes could be operated directly from the AC lines, if so desired, without the inclusion of a separate power transformer. This technique was especially advantageous in European receivers where the AC line potential is on the order of magnitude of 220 volts. Therefore, by direct rectification the DC potentials produced are perfectly compatible with the vacuum tube devices. Accordingly, many European and domestic manufacturers, as well, marketed television receivers without utilizing the relatively expensive power transformer. With such a background in mind, and the increased availability of transistors, those manufacturers would still desire to produce a television receiver for direct AC line operation and thereby avoid using an expensive power transformer. HOwever, as indicated above, the operating potentials required for transistor operation are not easily obtainable directly from the AC line. There are prior art circuit techniques for reducing the effective potential from the AC line as applied, for example, to a television receiver. Such techniques, however, dissipate excessive power and are limited in their regulation and current handling capabilities. Furthermore, coupled with the expanding semiconductor technology is the expanding utilization of color television transmission and receiving equipment.

Power supply design for color television receivers dictates stringent requirements for the functional and overall characteristics of the power supplies to be utilized therein.

Essentially the power supplies to be utilized in a color television receiver should preferably be well regulated against transients and varying voltage conditions which can and do occur on the AC lines. Such supplies should be regulated against varying load conditions which can occur within the television receiver itself. Furthermore, the operation of these supplies must be such that harmonic generation therein is well discriminated against so as to avoid stray coupling back to the high gain radio frequency or intermediate frequency amplifying stages.

A further desire in a television receiver is to provide a high voltage supply for operating the kinescope. Such a supply should be capable of providing a relatively high potential ultor voltage which is regulated according to AC line voltage and load current variations. This action results in a relatively constant raster size which is independent of AC line voltage and kinescope beam current variations.

When such supplies are operating in consumer equipments, as television receivers, one has to consider the wide spread distribution of such receivers and the operation of such receivers as affecting the power handling capability of the power companies. With regard to semiconductor devices, in general, as utilized in power supply equipment, a device which has found wide spread use for such application is the thyristor or the silicon controlled rectifier device. Such devices are basically phase controlled rectifiers whereby the conduction of the device can be made to depend upon a voltage applied to a control electrode referred to as the gate.

Many applications of controlled or switched rectifiers such as thyristors can be found in the prior art. Such prior art is concerned with protection circuits to allow these semiconductor devices to operate with reactive loads, or under varying line conditions, or under varying load conditions. The nature of such uses depends largely upon the specific application or environment in which the device is employed. However, it will be apparent that none of the prior art techniques serve to solve the many and peculiar problems faced in the operation and environment of a television receiver.

It is therefore an object of the present invention to provide improved thyristor power supply circuits for direct operation from AC line in economical and reliable configurations.

A further object is to provide a thyristor supply employing regulation and capable of providing a high operating potential for a kinescope.

According to a feature of the present invention, a thyristor is employed in a power supply configuration connected directly across the AC lines. The thyristor has the gate electrode coupled to a transistor circuit used for controlling the conduction angle of the thyristor, for regulation of the supply voltage. The base electrode of the transistor gate is provided with signals proportional to both the AC line voltage and the DC output voltage of the supply. The thyristor supply is also used to provide B+ for a horizontal output stage. The output transformer which is coupled to the horizontal output stage provides a stepped-up voltage which is rectified to produce the high voltage necessary to operate the ultor of the kinescope. The regulation provided to the thyristor is dependent upon the internal impedance of the power supply which is determined by the feedback used to provide the transistor with the voltage proportional to the DC output voltage. Regulation is affected by kinescope beam current, and is also dependent on line voltage variations, both of which operate to serve to provide a relatively constant raster size substantially independent of such variations.

These and other objects of the present invention will become clearer if reference is made to the following figures in which.

Figure 1:
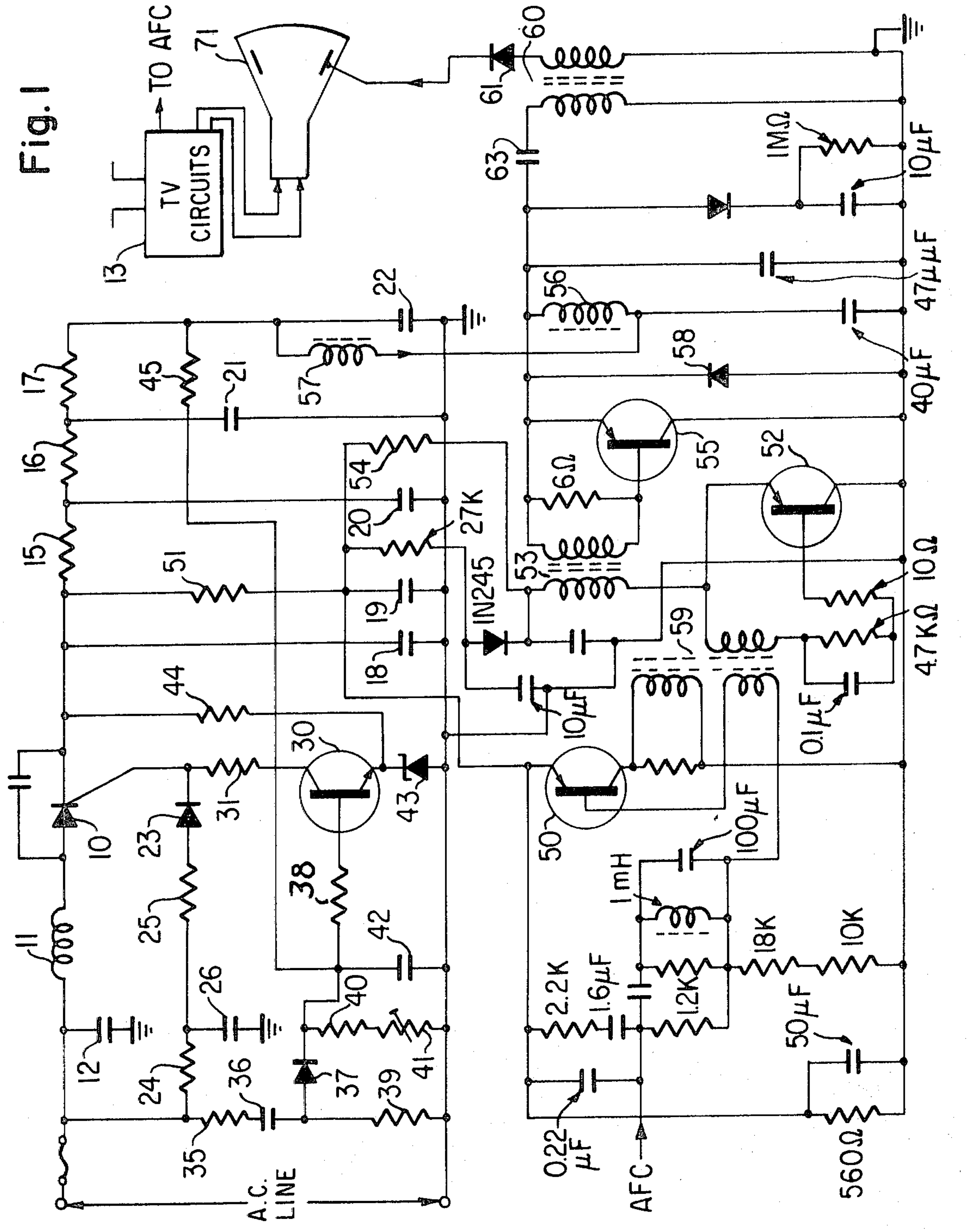
FIG. 1 is a schematic circuit diagram of a transistorized horizontal output stage employing a thyristor power supply.

FIG. 1 shows a thyristor 10 having an anode electrode coupled to one terminal or top terminal of the AC line via an inductor 11. Inductor 11 is selected of a magnitude to limit the switch-on current surge and, in general, for limiting the repetitive peak current through the thyristor. The inductance 11 preferably may be an iron core choke in series with a smaller value air core choke or only a powered or "C"-core choke and has a total inductance which may vary from about 3 to about 25 millihenries. This assures that under worst switch-on conditions for the thyristor 10, the maximum surge peak current is maintained within safe limits.

Inductor 11, serves to limit the current peaks while further providing suppression of fast wave fronts which would produce harmonic radiation in the thyristor power supply during the switching of the thyristor 10. Such radiation if too great in magnitude would undesirably tend the couple back to the highly sensitive input circuits 13 of the television receiver thus causing unnecessary interference.

Also shown coupled between the terminal of the inductor 11 and ground is a filter capacitor 12 which serves together with the inductor 11 to limit transients, thus serving further to protect the thyristor 10. The cathode of the thyristor is coupled to a plurality of series resistors 15, 16 and 17 useful in providing different voltage level outputs and low AC ripple for the supply in conjunction with the filter capacitors 18, 19, 20, 21 and 22 coupled between the various terminals of the resistors and the other terminal or reference terminal of the AC line.

The gate electrode of the thyristor 10 is coupled to the top side of the AC line through a diode 23 having its cathode coupled to the gate electrode and its anode coupled to the line side of the inductor 11 via resistors 24 and 25. The junction between resistors 24 and 25 is coupled to ground through a phase shift capacitor 26. Resistors 24, 25 and diode 23 form a trigger source for the gate electrode of thyristor 10 from the AC line. The amount of trigger pulse coupled to the gate is a function of the conduction of transistor 30. Therefore, the collector electrode of transistor 30 is coupled to the gate electrode of thyristor 10 via resistor 31. The base electrode of transistor 30 is AC coupled to the above-noted terminal of inductor 11, via the series circuit comprising resistor 35, capacitor 36, diode 37 and resistor 38. In this manner, as will be explained subsequently, the transistor 30 receives a control voltage which is dependent upon the magnitude of the applied AC voltage.

To complete the biasing path for the base electrode of transistor 30, the anode of the diode 37 is coupled to the reference side of the AC line via a resistor 39. The cathode of the diode 37, which is coupled to the base electrode of transistor 30, is bypassed to ground through the series combination of resistors 40 and 41 which are, in turn, shunted by a filter capacitor 42. A reference potential for the power supply is provided by the Zener diode 43 having its cathode coupled to the emitter electrode transistor 30 and the anode coupled to the reference side of the AC line. An operating bias for the Zener diode 43 is supplied via resistor 44 coupled between the emitter electrode of transistor 30 and the cathode electrode of the thyristor 10. A feedback resistor 45 couples the output of the power supply to the base electrode of transistor 30 to provide a voltage to transistor 30 which is dependent upon power supply loading.

The above-described configuration forms a low voltage supply employing input and output regulation by means of the transistor 30 as controlling the thyristor 10 and is used to supply operating potentials for a transistorized horizontal oscillator and output stages. The horizontal oscillator comprises a transistor 50 having the emitter electrode coupled to the cathode electrode of the thyristor 10 via a resistor 51 for supplying operating potential thereto. Transistor 50 is arranged in a blocking oscillator configuration provided by means of the windings of transformer 59 coupling the collector electrode thereof back to the base electrode. A third winding on the transformer 59 provides a driving signal for a horizontal output stage including transistor 52. Transistor 52 has the collector electrode thereof coupled to a point of reference potential and the emitter electrode coupled through the primary winding of a transformer 53 in series with a resistor 54 to a point of operating potential obtained from the thyristor power supply via resistor 51.

Transformer 53 has a secondary winding thereof coupled between the emitter and base electrodes of transistor 55 used in the horizontal output driver stage. Transistor 55 has the collector electrode thereof coupled to the point of reference potential and the emitter electrode coupled through the coil 56 in series with coil 57 to the cathode electrode of thyristor 10 via the series combination of resistors 15 to 17. Inductor 56 represents the horizontal deflection yoke for providing horizontal deflection of the kinescope beam.

A diode 58 is coupled between the emitter and collector electrode of transistor 55 and serves as a damper diode for the horizontal output stage and transformer. The emitter electrode of transistor 55 is further coupled to the primary of a transformer 60 via a capacitor 63. Transformer 60 presents a high voltage step-up ratio for the horizontal signal to provide a high voltage horizontal output signal at the secondary winding. The high voltage signal is rectified by means of the diode 61 and thence applied to the ultor electrode of a kinescope 71, for providing suitable high voltage thereto.

Operation of the circuit is as follows. The firing point of the thyristor 10 is controlled by transistor 30 which, when conducting, holds the gate voltage at a value lower than the thyristor cathode voltage, thus preventing firing. When transistor 30 turns off, the gate voltage rises and the thyristor fires. The turn off point of transistor 30 is controlled by an AC voltage derived via resistor 35 and capacitor 36 from AC power line and by a DC bias applied via resistor 45 from the DC output supply voltage. In this way, the thyristor firing point is a function of both the AC line voltage and the DC output voltage. The B+ voltage at the output of the thyristor supply is thus stabilized against AC line voltage variation via the control loop through resistor 35 and capacitor 36 and the effective DC source resistance is reduced because of the feedback afforded by resistor 45. The two types of stabilization provided by the circuit serves to stabilize the B+ voltage against the power line voltage variations and reduces the internal resistance of the power supply which is necessary to stabilize the picture width for changes in kinescope beam current.

If reference is made to FIG. 1, the sum of the output filter resistors 15 to 17 is greater than the effective internal impedance of the supply. If the beam current of the kinescope increases, the ultor voltage drops. For typical operation the deflection sensitivity increases with the square root of the ultor voltage, which means that less deflection current is needed as the ultor voltage falls. To obtain a desired constant picture width it is preferable to match the internal resistance of the power supply to the characteristics of the horizontal output transformer 60 as utilized. The regulated thyristor supply as shown can exhibit a desired internal resistance whose magnitude can be adjusted by varying the feedback to the regulation transistor 30 by choosing a suitable value for resistor 45. In using this technique one now has the capability of using relatively large smoothing resistor 15–17 for better filtering due to the lower effective internal resistance afforded by the feedback resistor 45.

specifically, current the picture width compensation is provided for as follows. If the beam current of the kinescope increases, the deflection current which depends on the voltage on the primary side of the horizontal output transformer 60 decreases at the same time. But because of the leakage inductance which exists between the primary and secondary side of the output transformer 60, the voltage drop on the secondary side is greater than that on the primary side. If the increase of the deflection sensitivity is greater than the drop of the deflection current due to the increased kinescope conduction, the B+ battery voltage which is proportional to the deflection urrent should decrease. This is accomplished by choosing a value for the internal resistance of the B+ power supply such that compensation is provided for an increase of the deflection sensitivity, with a corresponding decrease of the deflection current. The particular value of the internal resistance necessary to accomplish such B+ compensation is provided for by the feedback afforded by resistor 45 as coupled to the base electrode of transistor 30.

Hence, as the kinescope beam current increases, the voltage on the primary side of the transformer 60 decreases as does the deflection current. However, the deflection sensitivity varies as square root of the ultor voltage. Therefore, a given decrease in ultor voltage resulting in a given decrease in the secondary voltage, further results in a decrease in the primary current to cause the primary voltage to decrease in accordance with the deflection sensitivity of the kinescope.

By proper selection of the feedback resistor 45, the decrease in deflection current causes a proportional decrease in deflection voltage due to the internal power supply impedance controlled by the feedback. The drop in DC power supply voltage causes the horizontal output stage to provide less deflection signal for the lower kinescope voltage thus maintaining a relatively constant raster size for the kinescope.

With the above described technique it is apparent that by redetermining the decrease in the internal power supply impedance afforded by utilizing feedback, the picture width can be held relatively constant for varying kinescope currents.

Figure 2:
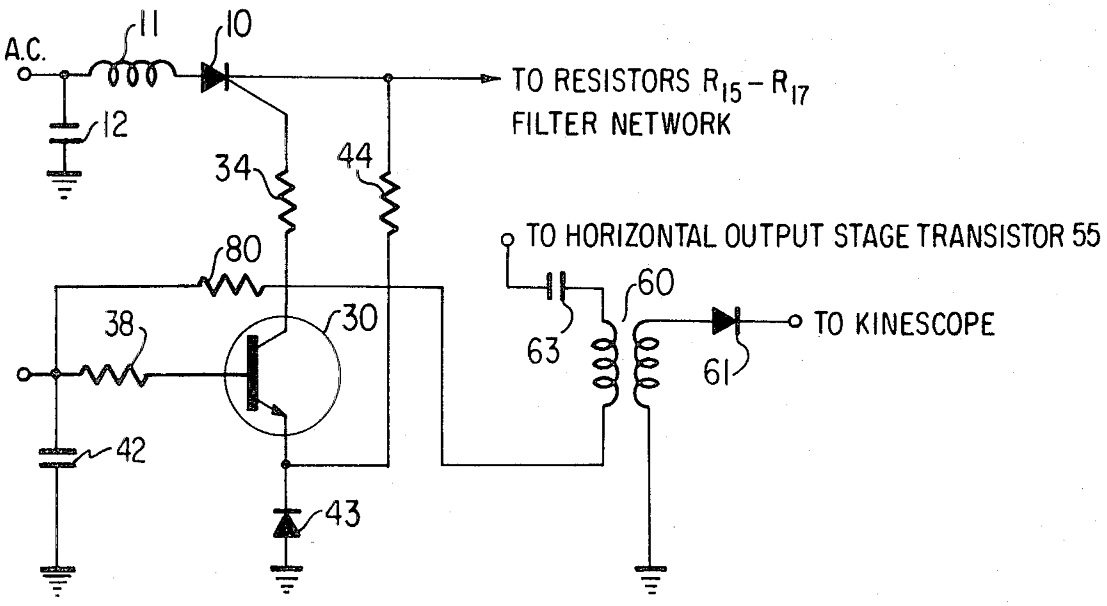
FIG. 2 is a schematic diagram of an alternate embodiment of a power supply according to the invention.

Referring to FIG. 2, there is shown an alternate embodiment employing feedback control of the thyristor regulation transistor 30 through the primary winding of the high voltage transformer 60.

The circuit shown uses similar circuitry for AC line regulation as described for FIG. 1. HOwever, as will be explained, the feedback provided here is used to maintain the kinescope ultor voltage relatively constant.

The regulation transistor 30 is provided with control information which varies as a function of kinescope beam current. As the kinescope current increases the kinescope voltage tends to fall. The increase in current through the primary of transformer 60 is applied to the base electrode of transistor 30 via resistor 80 which conducts more heavily and thus triggers the thyristor 10 sooner applying more average power to the filter network. This produces a higher B+, which in turn causes the horizontal output transistor stage, (transistor 55 of FIG. 1) to provide a larger voltage to the transformer 60, thus tending to increase the kinescope voltage. This action therefore compensates for the tendency of the ultor voltage to decrease and hence serves to maintain the ultor voltage relatively constant for changes in kinescope beam current.

It is apparent that such feedback information could alternatively be obtained by returning the resistor 80 to the secondary of transformer 60. Thereby monitoring the DC current flowing in the kinescope. In this instance the primary winding of the transformer 60 remains at ground and the secondary winding is coupled to the base electrode of transistor 30 via a resistor as 80.

A circuit shown in FIG. 1 operated to provide a high voltage and deflection thyristor supply which providing a substantially constant picture width relatively independent of power line voltage variations (+10 percent −15 percent) and beam current variations.

The circuit operated satisfactorily using the following:

| | | | |
|---|---|---|---|
| Resistors | 15 | | 22 ohms |
| | 16 | | 10 ohms |
| | 17 | | 10 ohms |
| | 24 | | 8.2 kilohms |
| | 25 | | 5.6 kilohms |
| | 35 | | 33 kilohms |
| | 38 | | 3.9 kilohms |
| | 39 | | 68 kilohms |
| | 40 | | 3.3 kilohms |
| | 41 | | 3.9 kilohms |
| | 44 | | 12 kilohms |
| | 45 | | 12 kilohms |
| | 51 | | 160 kilohms |
| Capacitors | 12 | | 0.22 ufd. |
| | 18 | | 800 ufd. |
| | 19 | | 500 ufd. |
| | 20 | | 250 ufd. |
| | 21 | | 250 ufd. |
| | 22 | | 500 ufd. |
| | 26 | | 1.2 ufd. |
| | 36 | | 0.333 ufd. |
| | 42 | | 2.2 ufd. |
| | 63 | 0.15 ufd. | |
| Inductors | 11 | | air coil |
| | | | 420 turns 0.7 |
| | | | CuL. (3 Mhy) |
| Inductor | 56 | | Horizontal Yoke |
| °≈200 μhy. | | | |
| | | | R=0.25 ohms |
| Diodes | 23 | | IN 3194 |
| | 37 | | IN 3754 |
| | 43 | | ZD 8.2 |
| | 58 | | IN 4785 |
| | 61 | | TV−18 |
| Thyristor | 10 | | 2N 3525 |
| Tansistors | 30 | | 2N 5184 |
| | 50 | | 2N 2614 |
| | 52 | | 2N 3732 |
| | 55 | | 2N 3731 |
| Input a. c. | | | 220 vac |
| Output volts | | | 31 volts /550 Ma |
| $+V_B$ for oscillator | | | 37 volts |
| and driver stages | | | at 95 milliamps |

What is claimed is:

1. A high voltage power supply suitable for supplying operating potential to a kinescope subject to beam current variations which tend to load the high voltage supply, comprising, a. a thyristor having anode, cathode and gate electrodes, said gate electrode operative to control the conduction between said anode and cathode electrodes upon application of a suitable potential thereto, b. a source of AC potential, c. means coupled to said thyristor for applying said source of AC potential to said anode electrode of said thyristor, d. means coupled to said gate electrode of said thyristor for applying a portion of the signal of said AC source to said gate electrode with a given polarity, e. a controllable variable impedance element coupled between said gate electrode and a point of reference potential for varying the conduction angle of said thyristor, f. filter circuit means coupled to said cathode electrode of said thyristor to provide a DC potential at an output thereof proportional to the magnitude of a signal conducted by said anode to cathode path of said thyristor, g. a trigger circuit coupled between said AC source and said variable impedance to control the impedance of said element and therefore the conduction angle of said thyristor according to the magnitude of said AC source signal, h. an oscillator circuit coupled to said filter circuit means and energized thereby to provide an oscillator signal, used for deflection of said kinescope, i. voltage step-up means including a rectifying device responsive to said oscillatory signal for providing a high DC potential therefor, suitable for application to said kinescope, j. means coupled between said filter means and said controllable impedance element responsive to said beam current variations for varying the impedance of said element and therefore of said power supply in accordance with said variations, to maintain said oscillator energized for providing an oscillatory signal of a magnitude determined in accordance with said beam current variations.

2. A power supply for use in a television receiver for providing a relatively high voltage for a kinescope, said supply being energized directly from the AC power lines, comprising, a. a thyristor having an anode, cathode and gate electrode, said anode to cathode path being coupled in series with one side of said AC power line, b. a transistor amplifier circuit having a collector electrode coupled to said gate electrode of said thyristor for varying the conduction angle of said thyristor in accordance with the conduction of said transistor, said transistor further having an input base electrode and a common emitter electrode, c. first means coupling said base electrode of said transistor to said one side of said AC line for providing a AC voltage to said base electrode, proportional to the magnitude of said AC potential, to cause said thyristor to conduct in accordance with said potential applied to said base electrode of said transistor, d. filter circuit means coupled to said thyristor for providing a DC potential thereacross in accordance with the magnitude of the conducted AC signal, e. an oscillator circuit having a terminal adapted for application thereto of a source of energizing potential necessary to cause said circuit to provide oscillatory signals, used for deflection of said kinescope, f. second means coupling said terminal to said filter circuit means for energizing the same, g. third means coupled to said oscillator responsive to said oscillatory signal for providing a high potential DC signal therefrom, h. feedback means coupled between said third means and said base electrode of said transistor responsive to the magnitude of said high potential DC for further controlling the conduction of said transistor and therefore said thyristor to cause said oscillator circuit to provide said oscillatory signal of a magnitude determined in accordance with said magnitude of said high potential DC, i. fourth means coupling said third means to said kinescope for applying said high potential DC thereto.

3. The power supply source according to claim 2 further including, a. an inductor coupled in series with said anode to cathode path of said thyristor said inductor selected of a magnitude to substantially reduce any radiated energy due to said conduction of said thyristor while limiting the peak repetitive current through said anode to cathode path.

4. The power supply according to claim 2 wherein said first means coupling said base electrode of said transistor to one side of the AC line comprises, a. a diode 37 coupled to said base electrode and poled in the same direction for easy current conduction as the base to emitter junction of said transistor, b. means including a series resistor, capacitor network coupled between said diode and said one side of said AC line.

5. The power supply according to claim 2 wherein filter circuit means, comprises, a. a plurality of resistors in series between the anode to cathode path of said thyristor and said other side of the AC lines, b. a plurality of capacitors each separate one coupled between a junction between said resistors and said other side of the AC lines, to provide with said resistors a plurality of resistor-capacitor filter networks.

6. The power supply according to claim 5 wherein said feedback means comprises, a. resistor coupled between a last one of said series resistors and said base electrode of said transistor.

7. The apparatus according to claim 2 wherein aid third means coupled to said oscillator comprises, a. a transformer having a voltage step-up ratio between the primary and secondary winding, said primary winding being coupled to said oscillator.

8. The apparatus according to claim 7 further comprising, a. a high voltage rectifier coupled between said secondary winding of said transformer and an electrode of said kinescope.

* * * * *

UNITED STATES PATENT OFFICE
CERTIFICATE OF CORRECTION

Patent No. 3,626,238 Dated Dec. 7, 1971

Inventor(s) Gerhard Forster

It is certified that error appears in the above-identified patent and that said Letters Patent are hereby corrected as shown below:

Column 2, line 53, that portion reading "powered" should read -- powdered -- .
Column 4, line 35, delete "current"; line 46, that portion reading "urrent" should read -- current --$_a$.
Column 5, line 58, that portion reading " = 200 μhy " should read -- L = 200 μhy -- and should be placed in the right hand column; line 64, that portion reading "tansistors" should read -- transistors -- .
Column 7, line 11, delete "37".
Column 8, line 10, that portion reading "aid" should read -- said -- .

Signed and sealed this 25th day of July 1972.

(SEAL)
Attest:

EDWARD M.FLETCHER,JR.
Attesting Officer

ROBERT GOTTSCHALK
Commissioner of Patents